United States Patent
Boyle

(10) Patent No.: US 7,077,475 B2
(45) Date of Patent: Jul. 18, 2006

(54) CHILD RESTRAINT SYSTEM

(75) Inventor: Donald C. Boyle, Indianapolis, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 51 days.

(21) Appl. No.: 10/865,283

(22) Filed: Jun. 10, 2004

(65) Prior Publication Data

US 2004/0251722 A1 Dec. 16, 2004

Related U.S. Application Data

(60) Provisional application No. 60/477,901, filed on Jun. 12, 2003.

(51) Int. Cl.
*A47D 1/10* (2006.01)

(52) U.S. Cl. .................... 297/250.1; 297/475

(58) Field of Classification Search ................ 297/476, 297/475, 479, 250.1
See application file for complete search history.

(56) References Cited

U.S. PATENT DOCUMENTS

| | | | |
|---|---|---|---|
| 2,195,334 A * | 3/1940 | Lethern | 297/484 |
| 2,257,099 A * | 9/1941 | Beirise | 242/384.7 |
| 3,945,586 A | 3/1976 | Higbee et al. | |
| 4,660,889 A | 4/1987 | Anthony et al. | |
| 4,679,852 A | 7/1987 | Anthony et al. | |
| 4,688,849 A | 8/1987 | Tsuge et al. | |
| 4,826,246 A | 5/1989 | Meeker | |
| 4,886,315 A | 12/1989 | Johnson | |
| 5,282,706 A | 2/1994 | Anthony et al. | |
| 5,286,090 A | 2/1994 | Templin et al. | |
| 5,370,333 A | 12/1994 | Lortz et al. | |
| 5,380,066 A | 1/1995 | Wiseman et al. | |
| 5,497,956 A | 3/1996 | Crook | |
| 5,511,856 A | 4/1996 | Merrick et al. | |
| 5,516,199 A | 5/1996 | Crook et al. | |
| 5,605,375 A * | 2/1997 | Friedrich et al. | 297/250.1 |
| 5,669,572 A | 9/1997 | Crook | |
| 5,779,319 A | 7/1998 | Merrick | |
| 5,839,789 A * | 11/1998 | Koledin | 297/476 |
| 6,017,088 A | 1/2000 | Stephens et al. | |
| 6,017,173 A | 1/2000 | Anthony et al. | |
| 6,030,047 A | 2/2000 | Kain | |
| 6,050,640 A | 4/2000 | Gibson et al. | |
| 6,338,529 B1 | 1/2002 | David et al. | |
| 6,637,826 B1 * | 10/2003 | Takayama | 297/484 |

* cited by examiner

*Primary Examiner*—Milton Nelson, Jr.
(74) *Attorney, Agent, or Firm*—Barnes & Thornburg LLP

(57) ABSTRACT

A child restraint system comprises a retractor attached to a child seat. A restraint harness is coupled at one end to the automatic retractor and is releasably attached at another end to a buckle attached to the child seat. The retractor is normally biased to tighten the harness but will yield to an opposite force sufficient to overcome the normal bias. The harness may be further tightened by actuating a manual adjustment device. The restraint harness may be any suitable restraint harness including a three-point, four-point, or five-point restraint.

20 Claims, 2 Drawing Sheets

CHILD RESTRAINT SYSTEM

This application claims priority to and the benefit of U.S. Provisional Patent Application No. 60/477,901, filed Jun. 12, 2003.

FIELD OF THE INVENTION

The present invention relates generally to a child restraint system for use with a child seat, and more specifically to a child restraint system configured for automatically biased tightening in combination with manual tightening of the restraint system.

BACKGROUND AND SUMMARY

This invention relates to the field of child restraint systems for controlling the tension and fit of a restraint harness about a child in a child seat. Several known pertinent references are commonly owned U.S. Pat. Nos. 5,380,066 and 5,779,319, and U.S. Pat. No. 4,688,849, the disclosures of which are incorporated herein by reference. The child restraint system comprises a retractor assembly capable of both automatic and manual adjustment, including incremental adjustment or ratcheting, of the restraint system's restraint harness. A reference pertinent to such incremental adjustment is U.S. Pat. No. 4,886,315, the disclosure of which is incorporated herein by reference.

The occupant restraint system disclosed herein comprises one or more of the features identified in the various claims appended to this application and combinations of such features as well as one or more of the following features or combinations thereof. A child seat is equipped with a three-point or a five-point restraint system comprising a restraint harness or assembly, a buckle, one or more tongues, a retractor, which may be an automatic retractor, and a manual tensioning device. The restraint system may be any suitable restraint system, including without limitation a three-point, a four-point, or a five-point restraint system. Illustratively, in the case of a five-point restraint system, the restraint harness comprises a pair of lap and shoulder portions, and a retraction portion. The restraint harness may be any flexible or semi-flexible member such as a web, a rope, a belt and the like. The buckle is attached to the seat and the tongues are movably disposed on the restraint harness and are lockingly and releasably engageable with the buckle to construct the five-point restraint. In the alternative, a pair of buckles may be movably disposed on the restraint harness and a tongue may be attached to the seat for releasable engagement with the buckles. As noted, alternative restraint systems, including for example and without limitation a three-point or a four-point restraint system, may be used instead of a five-point restraint system. The retractor comprises a spool having ratchet wheels or flanges at each end thereof. The spool may be coupled to a shaft, which in turn is movably coupled or mounted to a frame, as for example and without limitation between a pair of spaced apart plates. The frame may be carried by or mounted to the seat, for example to the front, the back, the side or the underside of the seat. The retraction portion of the harness is wound about and may but need not be attached to the spool.

A spool bias member is disposed between the spool and the frame and tends to urge the spool to move in a retracting or take-up direction to withdraw the retraction portion onto the spool to take up the slack in the harness to tighten the harness. A stop member, for example a pawl, movably mounted between the spaced-apart plates may engage the teeth of the ratchet wheel to inhibit movement of the spool in the retracting direction and to check, prevent or stop movement of the spool in a generally opposite pay-out direction. A stop bias member may urge the stop member into engagement and have a force or bias that counterbalances that of the spool bias member in normal or steady state conditions. The balanced or steady-state condition may be overcome either by manually rotating the spool in the retracting or take-up direction, or by directly moving the stop member away from engagement with the flange or ratchet wheel. In the instance of rotating the spool, the shaft may comprise an extension that allows the spool to be rotated in the take-up or retracting direction to further withdraw the retraction portion and wrap it about the spool to further decrease the operable length of the retraction portion and thereby tighten the harness around an occupant. The shaft or tensioning member may have a knob or actuation piece that facilitates the manual movement or rotation of the shaft. When the tensioning member or knob rotates the spool and ratchet wheel in the retracting direction, the teeth move or cam up the stop member which moves away from the teeth as the stop bias member yields to the rotation and camming or ratcheting forces. In this manner, the restraint member may incrementally be tightened or ratcheted by the described movement of the spool or tensioning member. In the instance of moving the stop member away from the spool, a release member may be actuated and held in the actuated position to move the stop member away from the spool, which would allow the spool bias member to urge the spool to rotate in the retracting or take-up direction but also yield to an external force pulling the restraint harness outwardly away from the spool in the pay-out direction which is generally opposite to the take-up or retracting direction. A pair of retractors, or more than two retractors, could be used as well. The components of the system may be fashioned from any suitable metallic, non-metallic, or composite material. These and other features of the present invention will become more apparent from the following description of the illustrative embodiments.

DESCRIPTION OF THE ILLUSTRATIVE EMBODIMENT

Figure 1:
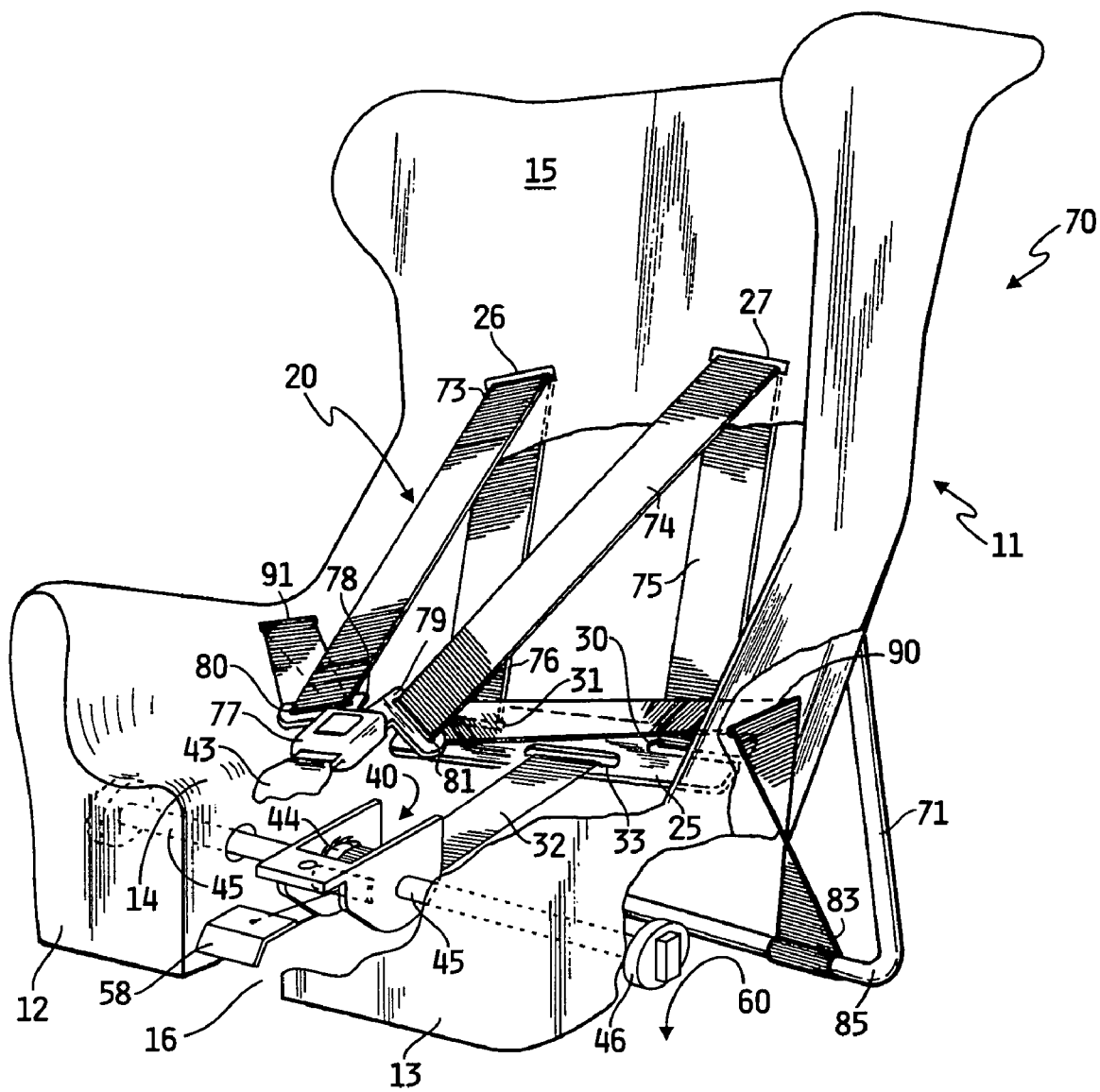
FIG. 1 is a perspective view of an illustrative child restraint system.

For the purposes of promoting an understanding of the principles of the invention, reference will now be made to an illustrative embodiment depicted in the drawings in which like numerals are employed to designate like parts throughout and specific language will be used to describe the illustrative embodiment. It will nevertheless be understood that no limitation of the scope of the invention is thereby intended.

Referring now to FIG. 1, there is shown an occupant restraint system generally comprising a child's seat 70 for restraining an occupant such as a child, a restraint harness or harness assembly 20 and a retractor or retractor assembly 40, which illustratively and without limitation may be an automatic locking retractor. The child seat 70 may be used as a stand-alone restraint system for a child, or may be used in conjunction with a restraint provided by a vehicle such as an automobile, a watercraft, an aircraft and the like. For example, the seat 70 may be placed atop an automobile seat (not shown) and secured thereto by any suitable means such as by the factory-installed seatbelt restraint system or by upper and lower attachments as for example and without limitation defined by Federal Motor Vehicle Safety Standard 225 (FMVSS 225) codified at 49 C.F.R. § 571.225, and now incorporated herein by reference. Seat 70 includes a main or support body 11 which illustratively may be molded or otherwise formed from plastic or other suitable material, such as for example and without limitation Styrofoam, to receive and support a child and which illustratively may but need not include a tubular frame 71 having a laterally extending bottom member 85. The support body 11 comprises a seat bottom 14 and a seat back 15. The seat bottom 14 is generally concave in configuration and integrally joined to the seat back 15. The seat bottom 14 and seat back 15 each may have positioned thereagainst a flexible and washable cushion. A groove 16 may but need not be provided in the front center portion of the seat with either front side 12 and 13 projecting forwardly thereof and against which the child's legs may be positioned. A retractor assembly 40 may be mounted to the seat within the groove in a generally vertical orientation with respect to the front sides 12, 13; although, illustratively, the depicted retractor assembly 40 is mounted to the under side of the seat portion 14 (FIG. 1) in a generally horizontal orientation with respect to the front sides 12, 13. It will be appreciated that the retractor assembly 40 may be carried by or mounted to the seat 70 at any suitable alternative location, such as for example and without limitation the underside of the seat bottom, or the back side of the seat back. It will further be appreciated that the seat 70 may be any suitable child seat, including those with a unified structure such that there is no split or groove in the front of the seat and no external support members or tubular frames. In addition, the seat need not have a seat back at all, such as in the case of a booster seat. Examples of suitable backless seats are found in commonly owned U.S. Provisional Patent Application Nos. 60/510,633, filed Oct. 10, 2003; 60/539,399, filed Jan. 27, 2004; and 60/550,350, filed Mar. 5, 2004, the disclosures of which are now incorporated herein by reference.

The child seat carries a restraint harness or system 20. The restraint harness 20 comprises a pair of flexible restraining members 73 and 74 such as for example a pair of webs, belts or straps or other suitable restraining members. The restraining members 73 and 74 comprise first ends 83 fixedly secured to the seat 70, for example to tubular frame 71. Proceeding from the frame 71, restraining member 73 extends through slot 91 and restraining member 74 extends through slot 90 to the front of the seat 70. The restraining members 73 and 74 then extend upwardly toward and through a pair of respective slots 26 and 27 to the back of the seat 70 and are then secured to a moveable anchor piece 25. Illustratively, anchor piece 25 may be a bar or plate that is rigid, and illustratively may be made of metal or other suitable non-metallic or composite material. Anchor piece 25 comprises a pair of slots 30 and 31, each of which may define an outwardly opening channel (not shown) to allow the respective bottom end portions 75 and 76 of the restraining members 73, 74 to be moved through the channel and mounted via slots 30 and 31 to the bar. Illustratively, each bottom portion 75 and 76 includes a loop-constructed end to allow the belts to be disengaged from anchor piece 25 via the respective channels (not shown). In the alternative, the anchor piece 25 may be devoid of said respective channels, in which case the bottom portions 75 and 76 could be non-permanently loop-constructed, as for example by hook-and-loops or by snaps, which would allow the loops to be deconstructed and the end portions 75 and 76 removed from the slots 30 and 31. It will be appreciated too that the bottom end portions 75 and 76 could be loop-constructed by for example stitching to more permanently or fixedly secure the end portions 75 and 76 to the anchor piece 25. One example of a suitable moveable bar is disclosed in U.S. Design Pat. No. D285,383, which is assigned to the assignee of the present invention, and the contents of which are incorporated herein by reference. Movably disposed on restraining members 73 and 74 are tongues 78 and 79 such that restraining member 73 extends through slot 80 formed in tongue 78 and restraining member 74 extends through slot 81 formed in tongue 79. Illustratively, the restraint harness comprises a third flexible restraining member 32, which is secured to anchor piece 25 generally between restraining members 73 and 74. Restraining member 32 comprises a retraction portion or end 34 affixed to the anchor piece 25. For example, end 34 may be fixedly or removable affixed to a third slot 33 in anchor piece 25. In the event it is desired to removably affix end 34 to anchor piece 25, end 34 may be of deconstructable loop-construction and/or slot 33 may include a channel (not shown) to allow disengagement as described above. The opposite end (not shown) of restraining member 32 extends away from anchor piece 25 and is coupled, mounted or affixed to a retractor or retractor assembly 40 as will be further explained. Illustratively positioned within groove 16 is a conventional seat belt buckle 77 which is fixedly fastened to the seat 70 by any suitable fastening device, such as for example a rivet, screw, tack, snap or other suitable fastener. In addition to being directly affixed to the seat 70, the buckle 77 may be mounted to a flexible restraining member 43, such as a web belt, which in turn is fixedly fastened to the seat 70.

Tongues 78 and 79 illustratively may be metallic and are configured to releasably and lockingly engage buckle 77. The tongues 78, 79 may also be fashioned from any suitable non-metallic or composite material. An alternate version of the FIG. 1 embodiment combination buckle/tongue combination is identical except that the positions of the buckle 77 and tongues 78, 79 are reversed as falls within the knowledge of those skilled in the art. When the buckle 77 and tongues 78 and 79 are releasably engaged, the restraint harness may conceptually be described as comprising one end defined by the engaged buckle/tongue combination 77, 78, 79 and an opposite end defined by the end of restraining member 32 coupled to the retractor assembly 40.

Illustratively, the retractor assembly or retractor 40 comprises frame 41, a pair of parallel and spaced apart sidewalls 42 and 43, a web spool 44, a spool bias member (not shown), a longitudinally extending axle, shaft or tensioning member 45, a longitudinally extending stop member or cam plate 48, a stop bias member 49, a mounting portion 55, a release member 58, and a release tether 59. Mounting portion 55 is provided with a mounting aperture 56 through which a conventional fastener (not shown) extends to mount the frame 41 to the seat 70. The side walls 42 and 43 are integrally joined to the frame 41. Spool 44 is movably mounted to and between sidewalls 42 and 43 by shaft or tensioning member 45, which is coupled to the retractor assembly and extends longitudinally through the spool 44 and each of the sidewalls 42 and 43. The spool 44 and tensioning member 45 may but need not be fixedly attached or coupled together and may move or rotate together about a common longitudinal axis with respect to the frame. The spool bias member (not shown), which may be for example a spring, is disposed in resilient contact between the spool 44 and the frame 41 and is operable normally to urge the spool 44 to rotate in a slack take-up or retracting direction 60, which in FIG. 1 illustratively is in a counter-clockwise direction. When the spool 44 moves in the retracting direction 60, the restraining member 32 is retracted and wound onto the spool 44 as depicted by arrow 61. Although the spool bias member (not shown) tends to urge the spool 44 to move in the retracting direction 60 to retract or withdraw the web 32 onto the spool 44 in order to take-up the slack in the web 32, it is at the same time yieldable to allow the restraining member 32 to be pulled outwardly for the withdrawal or pay-out of web 32 from the spool 44 in the pay-out direction which is generally opposite to the retracting direction 60.

The spool 44 further comprises a pair of spaced apart and ratchet shaped flanges 47 or end walls, which are coupled to and rotate with the spool 44 and tensioning member or shaft 45. The fragmented side wall 42 in FIG. 2 reveals the illustrative spaced apart tooth 50 pattern of the ratchet-shaped flanges 47 or ratchet wheels. Because the restraint member 32 is mounted to, wrapped about, coupled or affixed to the spool 44, as the axle rotates in the slack take-up or retracting direction 60 (FIG. 1), the restraining member 32 is further wound about the spool 44 to reduce the operative length of the restraint harness. Stop member or cam plate 48 is movably mounted to and between the sidewalls 42, 43. The stop bias member or spring 49 is mounted to the frame 41 and the stop member 48 and normally urges or tends to urge the stop member 48 against the ratchet wheels or flanges 47 in order to engage the spaced apart teeth 50. Thus, the stop member 48 and the ratchet wheel 47 and teeth 50 cooperate to lock, stop, check or prevent rotation of the spool 44 in the pay-out direction, which prevents the restraining member 32 from being unwound or unwrapped from the spool 44 in the pay-out direction. In addition, stop bias spring 49 holds the stop member 48 against the ratchet wheel with sufficient force to counterbalance the normal retracting force of the spool bias member (not shown) in order to prevent or inhibit movement in the take-up or retracting direction 60. However, the stop bias spring and the stop member 48 will yield to manual actuation of the tensioning member 45 in order to incrementally move or ratchet the spool 44 in the retracting direction 60, or yield to manual actuation of the release member 58 to move the stop member 48 away from the ratchet wheel. Actuation of the release member 58, which is coupled to the stop member 48, allows the retractor to move freely in either the retracting direction or the pay-out direction.

One end of the release tether 59 is attached or coupled to the stop member 48 and the other end of the release tether 59 is attached or coupled to the stop release member 58, which illustratively is but need not be disposed in groove 16. A user may actuate the release member 58 to move, as for example by pivoting, via the release tether 59 the stop member 48 out of engagement with the ratchet wheel(s) 47. When the release member 58 is actuated and held, the bias member 49 yields to the actuation force to allow the stop member 48 to be moved away or disengaged from the flanges or ratchet wheels 47. With the stop member moved away from the ratchet-shaped flanges 47, the spool bias member (not shown) is free to automatically move or rotate the spool 44 in the take-up or retracting direction 60 to take up any slack in the restraining member 32 in order to decrease its operative length to tighten the restraint harness, but the spool bias member is also yieldable to allow the spool to rotate in the opposite or pay-out direction if the restraint harness 20 is pulled outwardly away from the spool 44 in the direction opposite to arrow 61 causing the spool bias member to yield and allowing the web 32 to unwind or unwrap in order to increase the operative length of web 32 to slacken or loosen the fit of the restraint harness about an occupant.

Figure 2:
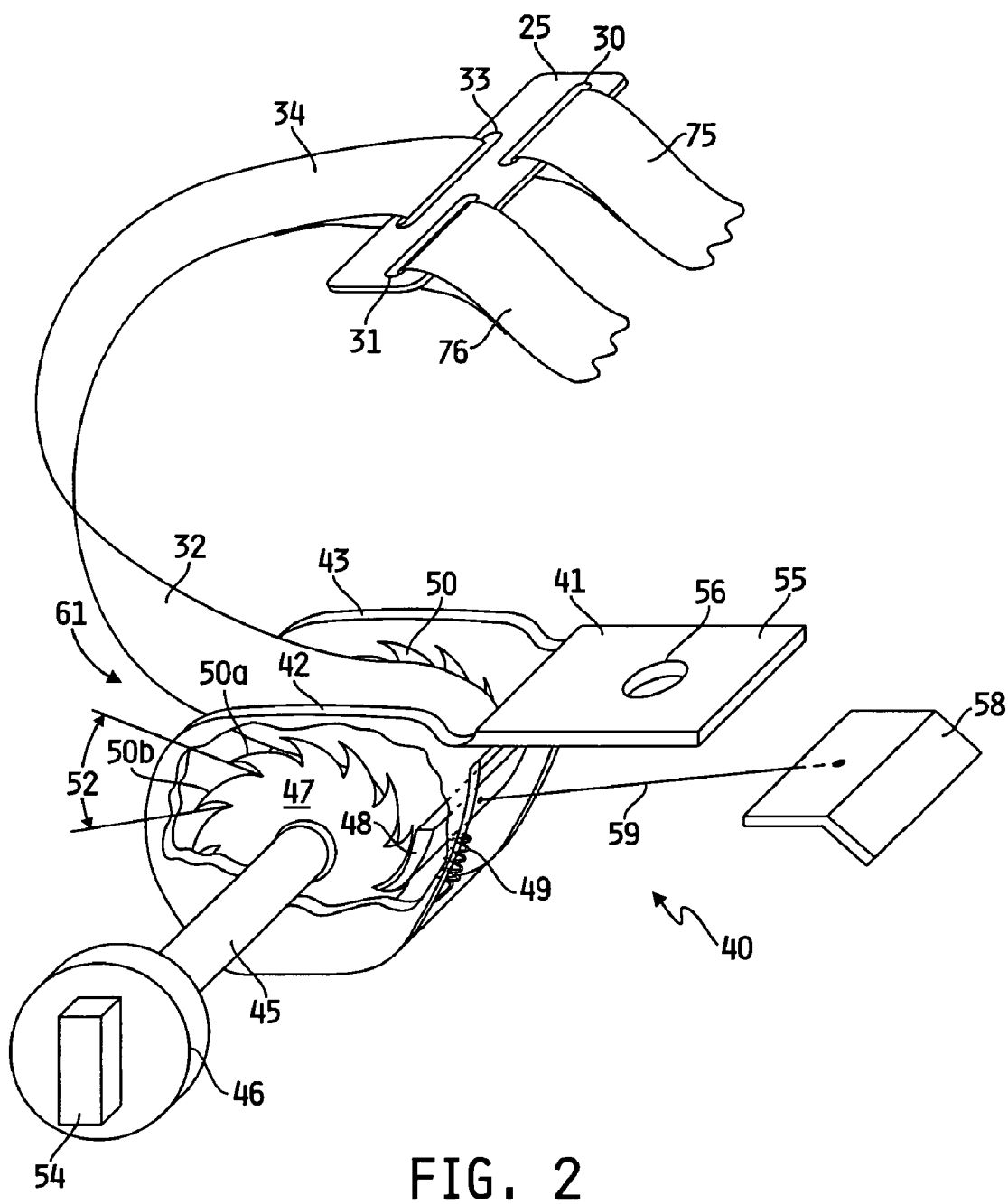
FIG. 2 is an enlarged fragmentary view of an illustrative retractor.

As noted above, the engagement of the stop member 48 with the ratchet wheels 47 also counterbalances the take-up force of the spool bias member to normally inhibit but not prevent rotation of the spool 44 in the take-up or retracting direction 61. This steady state counterbalancing of the spool bias force and the stop bias force may be overcome by ratcheting the spool in the retracting direction 60 as follows. Illustratively, extended shaft or tensioning member 45 may extend through one or both sidewalls 42 and 43, and may further extend through the one or both sides of the support body 11 or seat 70. Such a tensioning member 45, which illustratively may have an extended length of between three and eight inches beyond either or both sidewalls 42, 43, may further comprise a knob, manipulation piece or actuation piece 46, which illustratively may comprise a protrusion 54 to facilitate gripping and actuation. While FIG. 2 illustrates only one such extended tensioning member 45 and actuation piece 46, FIG. 1 illustratively depicts an extended tensioning member 45 and actuation piece 46 extending through both sidewalls 42 and 43 and through both sides of the child seat 70. Thus while turning actuation piece 46 in FIG. 1 in a counter-clockwise direction tightens the restraint harness, turning actuation piece 46 in FIG. 2 in a clockwise direction accomplishes the same tightening. The direction of turn on each side could be reversed as well. The tensioning member 45 and actuation piece 46 may form a tensioning mechanism alone or in combination. Indeed, it will be appreciated that while the extended shaft 45 may itself be a tensioning member without the need for an actuation piece 46, so too the actuation piece 46 could be coupled directly to the retractor 40 to act as a tensioning member. For example, the retractor could be located on the seat back without the need of the extended shaft.

It will be appreciated that the tensioning member 45 and the spool 44 may but need not rotate together in some instances. For example, the tensioning member 45 may be for example clutched so that it need not rotate when the spool rotates. Thus, when the spool is biased to rotate in the retracting direction, or when it is manually moved in the pay-out direction, the tensioning member 45 need not rotate. Conversely, when the tensioning member is used to move the spool, then it and the spool will both rotate. For example, turning the actuation piece or knob 46 in the web take-up or retracting direction 60 depicted in FIG. 1, rotates the tensioning member or shaft 45 and spool 44 and causes the teeth 50 to cam the stop member 48, which moves as the stop member spring 49 yields to the camming force generated by the force applied to the knob. When the turning and camming force ceases, the spring 49 again urges the stop member back against the ratchet wheels 47 to again lock the spool 44 against movement in the pay-out direction and to resist, deter or inhibit movement in the take-up direction 61. By this means, fine-tuned tightening of the restraint harness may be accomplished as the restraint harness is incrementally retracted, tightened, ratcheted or cinched down as described. The number of teeth 50 on each ratchet wheel 47 may be varied based on the amount of incremental travel desired, however, the number and relative disposition of teeth 50 on one flange 47 should be substantially the same as on the opposite end flange 47. In other words, the ratchet wheels or flanges 47 have corresponding pairs of spaced apart teeth 50. The spacing of the teeth 50 around the circumference of the flanges 47 determines the amount of travel as defined by an included angle 52 between any two teeth 50*a* and 50*b*. For example, if each flange 47 has five teeth, then the included angle 52 would be 72 degrees. If, on the other hand, each flange has twelve teeth, then the included angle 52 would be equal to 30 degrees. Therefore, the greater the number of teeth, the more precise and incremental may be the manual tightening of the restraint harness.

In an illustrative operation of the embodiment an occupant such as a child is placed on the seat bottom 14 in a sitting position and the restraining members 73 and 74 are drawn over the child's shoulders and across the child's chest and lap such that the tongues 78 and 79 and buckle 77 may be releasably and lockingly engaged to construct the five-point restraint harness system about the child. In the event that there is not enough slack in the restraint harness system 20 for engagement of the tongues 78, 79 and buckle 77, the release member 58 may be held in the actuated position to remove the stop member 48 from engagement with the flanges 47 and a sufficient outward force, as by pulling, may be applied to any portion of the restraint harness 20, which will be translated into a pulling outwardly away from the spool 44 of restraining member 32 resulting in the unwinding or paying out of the restraining member 32 from the spool 44 in a direction opposite to arrow 61. For example, webs 73 and 74 could be grasped and pulled outwardly away from seat back 15 as the release member 58 is being held in the actuated position. Once the tongues 78, 79 are disengageably received into the buckle 77, the release member 58 may be actuated and held in the actuate position as desired to move the stop member 48 from the engaged position and allowing the spool bias member (not shown) to automatically urge the spool in the take-up or retracting direction 61 to automatically take-up or wind the restraining member 32 around the spool 44 so as to take out slack in the restraint harness system 20 by reducing the operative length of web 32. Once this automatic tightening is accomplished, the release member 58 may be released, allowing the stop member to return to the engaged position at the urging of the bias member 49 to lock the spool 44 from moving in the pay-out direction and to oppose or inhibit movement in the retracting direction 61. To further tighten the restraint harness 20, if desired, manual ratcheting of the spool 44 may be accomplished as described by turning the manual tensioning member 45 an incremental turn in the take-up or retracting direction 60 to rotate the spool 44 in order to wind web 32 inwardly around the spool 44 in the retracting direction 61 until the desired fit of the restraint harness is obtained. Each partial or incremental turn of the tensioning member 46 is substantially equal to the angular distance 52 between the teeth 50 of the ratchet wheels or flanges 47. As the ratchet wheels 47 are rotated in the retracting direction 60, each incremental turn is accomplished when the stop member 48 engages the next successive tooth 50 of the flanges 47. The restraint harness 20 may be loosened at any desired time by again actuating the release member 58 to disengage the stop member 48 and by then applying sufficient force to any desired portion of the restraint harness to pull restraining member 32 outwardly from the spool 44 in the direction opposite to the retracting direction 61.

In an alternative embodiment, two or more automatic retractor assemblies having the described manual ratcheting capability may be used. In such an alternative embodiment, for example, opposite ends 75 and 76 of restraining members 73 and 74 may each be mounted to respective retractor assemblies, rather than to an anchor piece. It will be appreciated that the described embodiments may be used in conjunction with other tensioning devices such as with one or more in-line web adjusters as, for example, any of those described in commonly owned U.S. patent application Ser. No. 10/427,362, filed 30 Apr. 2003, the disclosure of which is incorporated herein by reference. The above described child restraint system is illustrative of conventional child seat harness restraint systems and is not intended to limit the disclosed invention. Those skilled in the art will appreciate that numerous alternative child seats and harness systems may be readily adapted for use as alternative embodiments of the disclosed invention. In addition the components of the described system may be fashioned from any suitable metallic, non-metallic or composite material by any means of manufacture suitable to the chosen material.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. An occupant restraint system comprising:
   a child seat;
   a restraint harness having a retraction portion,
   a retractor carried by the child seat and receiving therein the retraction portion of the restraint harness, the retractor normally biased in a retracting direction to automatically draw the retraction portion of the restraint harness into the retractor to tighten the restraint harness against an occupant of the child seat, and
   a tensioning member extending through an exterior portion of the child seat and coupled to the retractor and manually actuatable to further tighten the restraint harness against the occupant of the child seat.

2. The occupant restraint system of claim 1 wherein the restraint harness comprises a five-point restraint harness.

3. The occupant restraint system of claim 1, wherein the restraint harness comprises a three-point restraint harness.

4. The occupant restraint system of claim 1 wherein the retractor comprises a stop member normally biased to inhibit free movement of the retractor in the retracting direction and to stop movement of the retractor in a pay-out direction generally opposite to the retracting direction.

5. The occupant restraint system of claim 4 further comprising a release member coupled to the stop member, the release member actuatable to allow the retractor to freely move in either the retracting direction or the pay-out direction.

6. The occupant restraint system of claim 4 wherein the retractor comprises a ratchet wheel, and wherein the stop member is normally biased into engagement with the ratchet wheel.

7. The occupant restraint system of claim 6 wherein actuation of the tensioning member moves the ratchet wheel in the retracting direction causing the stop member to yield.

8. The occupant restraint system of claim 6 wherein the ratchet wheel comprises a plurality of spaced apart teeth, the stop member and the teeth cooperating to inhibit movement of the ratchet wheel in the retracting direction, and wherein actuation of the tensioning member moves the ratchet wheel in the retracting direction sufficiently to allow the teeth to overcome the bias of the stop member.

9. An occupant restraint system comprising:
   a support body, an automatic retractor assembly mounted to the support body, a restraint harness comprising a restraining member having one end mounted to a tongue configured to releasably and lockingly engage a buckle attached to the support body, and an opposite end mounted to the automatic retractor assembly, a bias member normally urging the automatic retractor assembly in a retracting direction to take up slack in the restraining member but yieldable to allow pay-out of the restraining member in a pay-out direction generally opposite to the retracting direction, and a manual tensioning member extending through an exterior portion of the support body and actuatable to incrementally retract the restraining member within the automatic retractor assembly.

10. The occupant restraint system of claim 9 wherein the restraint harness comprises a five-point restraint harness.

11. The occupant restraint system of claim 9 wherein the restraint harness comprises a three-point restraint harness.

12. The occupant restraint system of claim 9 wherein the biasing member comprises a stop member normally inhibiting movement of the automatic retractor assembly in the retracting direction, and further comprising a release member coupled to the stop member, the stop member yielding to actuation of either the release member or the manual tensioning member to thereby allow movement of the automatic retraction assembly.

13. An occupant restraint system configured for use in a vehicle, the occupant restraint system comprising:

a child seat having a support body configured to receive an occupant, the support body comprising a seat back and a seat bottom, a restraint harness for restraining the occupant of the child seat, the restraint harness defining opposing ends, a retracting device carried by the seat, the retraction device comprising a frame, a ratchet wheel movably mounted to the frame and including a plurality of spaced apart teeth pairs wherein one of the opposing ends of the restraint harness is received about the ratchet wheel, the ratchet wheel defining a longitudinal axis, a stop member biased to engage any of the plurality of teeth and movable away from the teeth to allow the ratchet wheel to move freely about the longitudinal axis in order to adjust the fit of the restraint harness about the occupant, and a tensioning mechanism comprising a shaft extending through an exterior portion of the child seat and coupled to the ratchet wheel and an actuation piece mounted to the shaft, wherein turning the actuation piece moves the ratchet wheel sufficiently to overcome the bias of the stop member and incrementally tighten the restraint harness about the occupant.

14. The occupant restraint system of claim 13, wherein the ratchet wheel is normally biased in a retracting direction, but yieldable to allow the restraint harness to be moved in a pay-out direction generally opposite to the retracting direction, and wherein the ratchet wheel is prevented from moving in either the retracting direction or the pay-out direction when the stop member and the teeth are engaged with each other.

15. The occupant restraint system of claim 14, wherein the restraint harness comprises a five-point restraint harness.

16. The occupant restraint system of claim 14, wherein the restraint harness comprises a three-point restraint harness.

17. A method of restraining an occupant in a child seat comprising the steps of:

providing a child seat having an automatic locking retractor mounted thereto, unlocking the retractor to allow the retractor to automatically move in a retracting direction to tighten a restraint harness connected at one end to the retractor and releasably connectable at another end to the seat, and manually actuating a tensioning member extending through an exterior portion of the child seat and coupled to the retractor to further tighten the restraint harness.

18. The method of claim 17 further comprising the step of biasing a stop member into locking engagement with the retractor in order to inhibit movement of the retractor.

19. The method of claim 18 further comprising the step of actuating a release member in order to move the stop member out of locking engagement with the retractor in order to allow movement of the retractor in both the retracting direction and a pay-out direction generally opposite to the retracting direction.

20. The method of claim 17 further comprising the steps of:

biasing a stop member into locking engagement with the retractor in order to inhibit movement of the retractor, and biasing the retractor in the retracting direction, and wherein the unlocking step further includes actuating a release member in order to move the stop member out of locking engagement with the retractor.

* * * * *